June 25, 1940.  T. J. CLARK  2,205,758
FILTER SCREEN
Filed July 20, 1937  2 Sheets-Sheet 1

INVENTOR
Thomas J. Clark
BY
Victor S. Beam
ATTORNEY

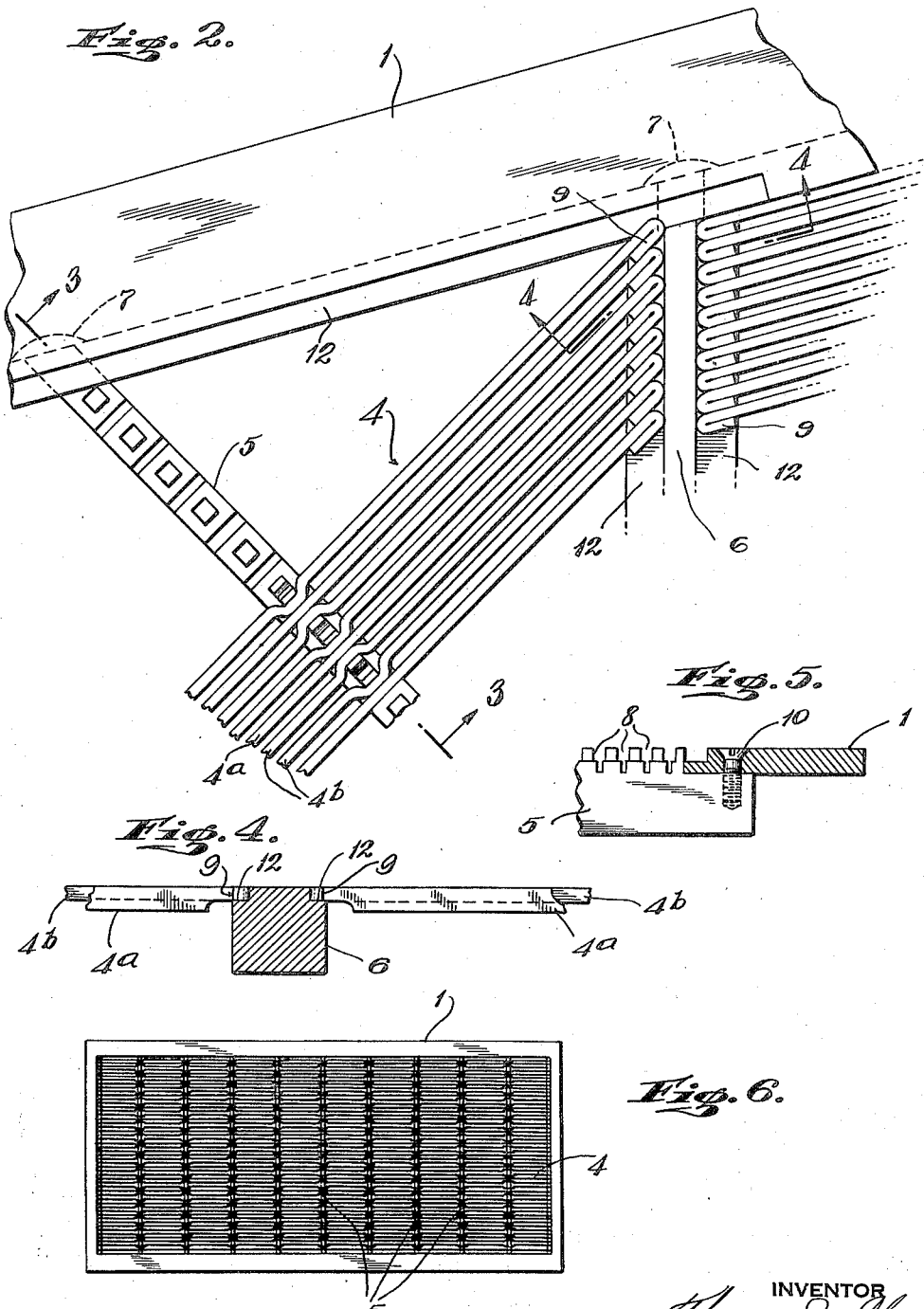

Patented June 25, 1940

2,205,758

UNITED STATES PATENT OFFICE 2,205,758

FILTER SCREEN

Thomas J. Clark, Carbondale, Pa., assignor to Hendrick Manufacturing Company, a corporation of Pennsylvania Application July 20, 1937, Serial No. 154,543

3 Claims. (Cl. 210—169)

My invention is applicable to screens for sewage and the like and relates particularly to the method and means for mounting and fastening screening strips to supporting bars and the method and means for combining the supporting bars and their attached screening strips to form segments or units of various shapes.

According to my plan of construction, the screening strips may be rapidly and firmly mounted on the supports without the necessity for expensive soldering, welding or braising heretofore used, and I get as a result an efficient screen with a minimum number of parts.

My construction is readily adaptable to the various requirements of screen construction and application, such as providing the most advantageous direction of placement of the screening strips and arranging said strips in such a manner as to provide a wider opening on the egress side of said screen as compared to that on the ingress side thereof. In addition, because of my construction, the materials used may be limited to those which are best suited to the purpose from the standpoint of strength and freedom from attack or deterioration by the materials which it is desired to screen.

These and other advantages will be apparent from the description and the drawings and will be elaborated upon in the claims.

In the attached drawings, Fig. 1 is a plan view of a screen constructed according to my invention in the form of a segment which may be used alone or as a part of a composite circular screen for liquids or semi-liquids, such as sewage.

Fig. 2 is a section of the screen shown in Fig. 1, taken at the point A of said screen.

Fig. 4 is a section on line 4—4 of Fig. 2 showing the means for supporting the ends of the screening strips and their relative depth.

Fig. 5 shows a modification of Fig. 4.

Fig. 6 shows a rectangular screen, being a modification of Fig. 1.

Figure 1:
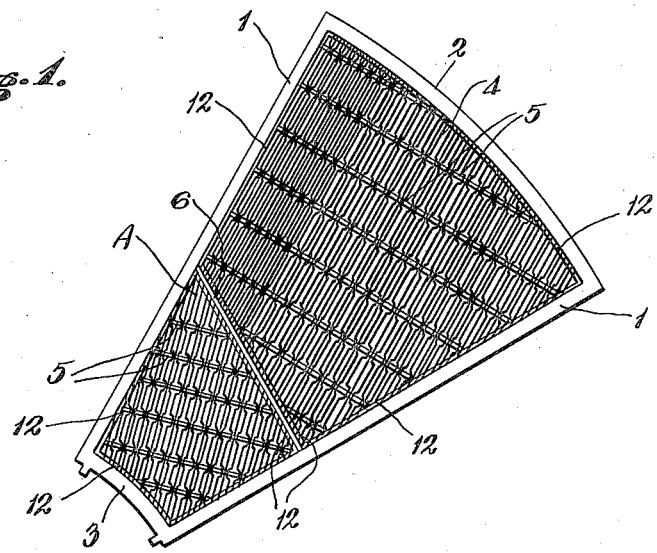

The screen of Fig. 1 is made up of side bars, 1—1 and curved end-pieces 2 and 3. The screening strips which are designated in general by 4 are securely mounted side by side upon the cross-bars 5 with sufficient firmness to allow of their ends simply resting upon the ledges 12 of the frame pieces 1, 2 or 3 or diagonal bars 6 with sufficient spacing between them to allow the passage of liquid or semi-liquid substances therethrough, but preventing the passage of solids or semi-solid materials above a predetermined size or bulk. These strips 4 are of different depth, as will later be more particularly explained. The cross-bars 5 in any particular section are also arranged parallel to each other and are mounted, in some instances, with each end attached to a side 1 of the screen, while in other cases only one end is attached to either of the side pieces and the other end is attached to either of the ends 2 or 3 of the screen, while in still other cases, one end is attached to one of the sides 1 of the screen and the other end to a diagonal bar 6 running diagonally with respect to the two sides of the screen for a purpose hereinafter explained.

While these strips 4 are attached to a number of supporting bars 5 throughout their length, their ends rest upon either the sides 1 of the screen or the ends 2 or 3 or upon the diagonal cross-bar 6 in a manner hereinafter described.

While it is, in general, desirable to have the screening strips lie parallel to each other in a screen, it is often desirable, depending upon the manner of mounting the screen and upon the particular function that it is to perform with respect to other apparatus, such as a brush mounted to rotate in close proximity to the screen to brush away the solids and other matter that will not pass through the screen, to arrange the strips of one group at an angle to the strips of another group upon the screen. It is for the purpose of carrying out this variation in direction of the strips that the diagonal bar 6 is placed upon and connected to the side bars 1 of the frame.

It is to be understood that this diagonal bar 6 may be placed at various angles with respect to said frame or it may even be mounted to extend to the curved end-bars 2 and 3 of the frame or to one of these end-bars and one of the sides of the screen or, indeed, a number of such diagonal bars may be included within the frame and running at various angles, depending upon the direction that it is desired to have the screening strips extend in any particular part of the screen, depending upon the strengthening that is desired in any particular part.

It is one of the advantages of my method of mounting and attaching the screening strips and their supporting bars that they may be readily arranged in groups in various ways to take care of the various requirements, arrangement, operating and mounting of the screen.

Figure 3:
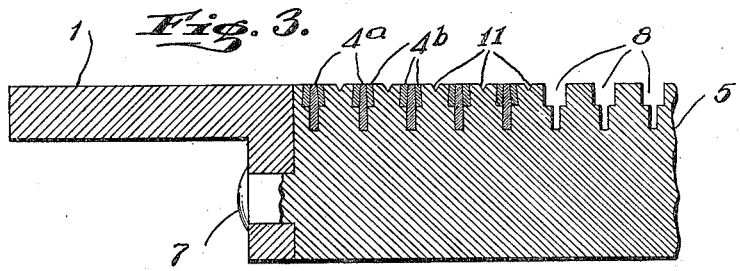
Fig. 3 is a section of a supporting bar, taken along the line 3—3 of Fig. 2 and shows in detail the method of mounting the supporting bar and also shows the method of fastening the screening strips.

Fig. 2, which shows a portion of Fig. 1, such as at A, illustrates my method of mounting the individual strips on a cross-bar 5, with one of their ends resting upon a portion of the diagonal bar 6. It will be seen that the cross-bar 5 is attached to the side 1 of the frame by extending through a flange at the bottom thereof and having its end portion upset as at 7. This arrangement is shown more in detail in Fig. 3 where the cross-bar 5 is shown in side view with its end at the left fastened to a downwardly extending flange on the side-piece 1, as previously explained. This Fig. 3 shows a section of the screening strips as they are mounted in the cross-bar 5 and also shows at 8 three unfilled receptacles for the screening strips. While I have designated the screening strips generally as 4 in Fig. 1 it will be seen from Fig. 3 that these strips are of different depths and I have designated the deeper ones as 4a and the ones of lesser depth as 4b in that figure. In this Figure 3 these screening strips 4a and 4b are shown as contiguous to each other in groups of one strip 4a and two strips 4b, but these strips are in this contiguous arrangement only at the point of attachment to the cross-bar 5. Fig. 2 shows this contiguous arrangement at the point of fastening to the cross-bar 5, but also shows the arrangement of these strips in lengths between the cross-bar 5 and their other supports, such as the diagonal bar 6. In addition to the spacing of these strips provided for by their configuration and their mounting in cross-bar 5, their ends are spaced apart by being bent back on themselves as at 9. The supporting of the ends of these screening strips and their relative depths are shown in Fig. 4. While I have shown in Fig. 3 the cross-bar 5 as attached to a depending flange of the side bar 1 of the frame, this cross-bar 5 may be fastened more directly to the bar 1 by means of a screw 10, as shown in Fig. 5. This means of attaching the cross-bars to the side bars is more applicable to cases where the cross-bar is to extend at other than a right-angle from the frame bar, but the means of fastening shown in Fig. 3 can be used also when the angle between cross-bar and frame-bar is acute or obtuse.

In Fig. 6 the screen is of rectangular shape which may also be used to form a large circular structure. The frame structure is designated as 1, with the cross-bars 5 having their ends mounted at right-angles to the frame 1, and my method of mounting the screening-strips 4 is quite readily adapted to this form in a very simple manner.

The method and means of attaching the screening-strips 4a and 4b to the cross-bar 5 is shown in Fig. 3. The bar 4a, having the greater depth, is first inserted in the space or opening 8 and then a previously bent bar 4b is placed on either side of it so as to completely fill the space 8. With these screening strips 4a and 4b in position in the receptacle 8, a chisel or similar tool is placed at the point 11 and struck with force, creating an indentation cross-wise on supporting bar 5 and forcing the metal of the portion between the slots 8 laterally so as to pinch or crimp the strips 4a and 4b in a firm and rigid position. It will thus be seen that every third strip is straight and of the greater depth and the others are definitely offset at their points of attachment to the cross-bars and are of lesser depths. This arrangement provides a definite spacing of the strips and, at the same time, ease of egress of the screened material from the underside of the screen, due to the difference in the depths of the strips.

The screening strips 4 or 4a and 4b and the cross and other bars may be made of manganese bronze which readily withstands the acids or other elements of sewage and, since these parts are fabricated by mechanical means rather than by braising, welding or soldering, my screen will be more durable and efficient for a longer life.

By my invention a screen is produced in a simple and cheap construction which may readily be assembled and taken apart and reconstructed to suit the conditions and requirements for the bearing bars may be readily detached from the frame bars and the number and position of the diagonal bars may be readily changed.

While I have shown and described two forms of screens, it will be understood that many other forms and configurations may be constructed utilizing my method of arranging and supporting the screening strips and cross-bars and it will also be understood that the direction of strips and cross-bars, their number and supports, may be varied at will to suit the particular requirements of application.

I claim:

1. In a filtering screen, a support, slots in said support for the reception of screening strips, a series of straight strips located one in each slot, other screening strips located one on each side of and in contact with each of said straight strips in the slots and offset therefrom at each end of the slots an equal distance from and extending parallel thereto.

2. In a filtering screen, a screening strip support having slots therein for the reception of screening strips, a plurality of screening strips mounted and crimped in groups of three, side by side in the slots of said support, the center strip of each group extending normally from its slot and the strips on either side of said normally extending strip being offset laterally as they emerge from said slot to extend in spaced relation and parallel to said normally extending strip and to the strips extending from other slots.

3. In a filtering screen, a frame consisting of a cross-bar provided with a series of slots, a straight screening strip and two laterally offset screening strips located in each slot, and bearing bars for supporting the ends of said screening strips.

THOMAS J. CLARK.